United States Patent
Pemper et al.

(10) Patent No.: US 11,243,328 B2
(45) Date of Patent: Feb. 8, 2022

(54) DETERMINATION OF ELEMENTAL CONCENTRATIONS FROM THE CAPTURE AND INELASTIC ENERGY SPECTRA

(71) Applicant: Weatherford Technology Holdings, LLC, Houston, TX (US)

(72) Inventors: Richard R. Pemper, Sugar Land, TX (US); Guojing Hou, San Jose, CA (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/734,503

(22) PCT Filed: Sep. 24, 2018

(86) PCT No.: PCT/US2018/052377
§ 371 (c)(1),
(2) Date: Dec. 2, 2020

(87) PCT Pub. No.: WO2019/240831
PCT Pub. Date: Dec. 19, 2019

(65) Prior Publication Data
US 2021/0231828 A1    Jul. 29, 2021

Related U.S. Application Data (60) Provisional application No. 62/689,337, filed on Jun. 25, 2018, provisional application No. 62/683,749, filed on Jun. 12, 2018.

(51) Int. Cl.
*G01V 5/10* (2006.01)

(52) U.S. Cl.
CPC .............. *G01V 5/102* (2013.01); *G01V 5/108* (2013.01)

(58) Field of Classification Search
CPC ........... G01V 5/101; G01V 5/10; G01V 5/102
See application file for complete search history.

(56) References Cited

U.S. PATENT DOCUMENTS

| | | | |
|---|---|---|---|
| 7,366,615 | B2 | 4/2008 | Herron et al. |
| 7,408,150 | B1 | 8/2008 | Flaum et al. |
| 7,446,308 | B2 | 11/2008 | Gilchrist et al. |
| 7,718,955 | B2 | 5/2010 | Pemper et al. |
| 8,101,907 | B2 | 1/2012 | Jacobi et al. |
| 8,809,798 | B2 | 8/2014 | Mendez et al. |
| 10,429,540 | B2 * | 10/2019 | Grau ............... G01V 5/101 |

(Continued)

OTHER PUBLICATIONS

International Search Report and Written Opinion regarding corresponding PCT Application No. PCT/US2018/052377, dated Mar. 19, 2019.

(Continued)

*Primary Examiner* — David P Porta
*Assistant Examiner* — Fani Boosalis
(74) *Attorney, Agent, or Firm* — Lewis & Reese, PLLC (57) ABSTRACT

Methods and systems for determining the elemental composition of formation rock are disclosed. The systems include a pulsed-neutron geochemical logging tool that is conveyed in a borehole traversing the formation. The pulsed-neutron geochemical logging tool can collect inelastic and capture neutron spectra. The inelastic and capture spectra are processed to provide the elemental composition of formation rock after removing contributions due to elements in the borehole and in the pores of the formation.

20 Claims, 8 Drawing Sheets

Figure 7

(56) References Cited

U.S. PATENT DOCUMENTS 10,466,384 B2 * 11/2019 McKeon .................. G01V 5/08
2016/0195636 A1 7/2016 Grau et al.

OTHER PUBLICATIONS

Hou, Guojing, "Development of Sensor Physics for a Nuclear Oil Well Logging Tool," Jun. 30, 2017, pp. 1-118, retrieved from the internet on Feb. 2, 20191 <https://repository.lib.ncsu.edu/handle/1840.20/34438>.

* cited by examiner

Figure 9  Table 2: Comparison of Tool Measurements with Core Data

| Category | Formation | Porosity | Type | Sigma | Al | C | Ca | Fe | Mg | S | Si | Ti |
|---|---|---|---|---|---|---|---|---|---|---|---|---|
| Sandstone | Jasper | 0.5 p.u. | Core | 6.7 c.u. | 0.3 | 0.1 | 0.1 | 0.1 | 0.0 | 0.0 | 46.2 | 0.04 |
| | | | PES | 6.6 c.u. | 0.2 | 0.0 | 0.1 | 0.0 | 0.0 | 0.4 | 46.1 | 0.00 |
| | Fort Worth | 7.6 p.u. | Core | 7.9 c.u. | 0.8 | 0.0 | 0.1 | 0.3 | 0.1 | 0.1 | 44.1 | 0.10 |
| | | | PES | 8.6 c.u. | 0.7 | 0.0 | 0.0 | 0.1 | 0.1 | 0.1 | 45.8 | 0.01 |
| | Plumpton | 12.2 p.u. | Core | 9.3 c.u. | 1.2 | 0.0 | 0.0 | 0.2 | 0.0 | 0.0 | 44.5 | 0.04 |
| | | | PES | 8.8 c.u. | 1.3 | 0.0 | 0.0 | 0.2 | 0.0 | 0.2 | 44.7 | 0.00 |
| | Clashach | 17.7 p.u. | Core | 9.2 c.u. | 0.9 | 0.0 | 0.0 | 0.1 | 0.0 | 0.0 | 45.2 | 0.04 |
| | | | PES | 9.2 c.u. | 0.9 | 0.0 | 0.0 | 0.0 | 0.0 | 0.1 | 45.2 | 0.00 |
| Limestone | Salterwath | 0.4 p.u. | Core | 10.5 c.u. | 0.4 | 11.1 | 35.8 | 0.2 | 0.8 | 0.2 | 2.9 | 0.02 |
| | | | PES | 9.0 c.u. | 0.3 | 11.1 | 36.0 | 0.1 | 0.0 | 0.6 | 3.4 | 0.02 |
| | Danby Marble | 0.7 p.u. | Core | 7.6 c.u. | 0.2 | 11.5 | 38.2 | 0.1 | 0.2 | 0.0 | 0.8 | 0.01 |
| | | | PES | 8.2 c.u. | 0.1 | 11.2 | 38.2 | 0.1 | 0.0 | 0.1 | 1.8 | 0.18 |
| | Derbyshire | 8.3 p.u. | Core | 8.8 c.u. | 0.0 | 11.3 | 39.3 | 0.0 | 0.2 | 0.0 | 0.1 | 0.01 |
| | | | PES | 8.4 c.u. | 0.0 | 9.7 | 40.0 | 0.0 | 0.0 | 0.1 | 0.0 | 0.00 |
| | Chauveigny | 23.8 p.u. | Core | 11.7 c.u. | 0.0 | 12.0 | 39.6 | 0.0 | 0.3 | 0.1 | 0.1 | 0.00 |
| | | | PES | 10.6 c.u. | 0.0 | 8.5 | 40.0 | 0.0 | 0.0 | 0.1 | 0.0 | 0.00 |
| Dolomite | Lee | 0.8 p.u. | Core | 6.0 c.u. | 0.0 | 13.0 | 21.7 | 0.1 | 13.1 | 0.0 | 0.0 | 0.01 |
| | | | PES | 5.8 c.u. | 0.0 | 13.8 | 21.0 | 0.0 | 13.5 | 0.1 | 0.1 | 0.01 |
| | Mill Creek | 4.8 p.u. | Core | 5.6 c.u. | 0.1 | 12.7 | 21.7 | 0.1 | 12.5 | 0.0 | 0.5 | 0.01 |
| | | | PES | 5.8 c.u. | 0.0 | 13.0 | 21.3 | 0.1 | 12.5 | 0.1 | 1.4 | 0.05 |
| | Whitwell | 12.7 p.u. | Core | 9.8 c.u. | 0.0 | 12.7 | 21.2 | 0.4 | 12.9 | 0.0 | 0.3 | 0.01 |
| | | | PES | 10.5 c.u. | 0.0 | 14.3 | 22.4 | 0.7 | 12.2 | 0.1 | 0.0 | 0.01 |
| Granite | Charcoal Black | 0.5 p.u. | Core | 17.6 c.u. | 7.8 | 0.0 | 2.7 | 3.0 | 1.2 | 0.0 | 29.7 | 0.34 |
| | | | PES | 17.6 c.u. | 8.1 | 0.1 | 2.9 | 2.7 | 1.8 | 0.6 | 28.7 | 0.14 |
| | Lac du Bonnet | 0.7 p.u. | Core | 10.6 c.u. | 7.3 | 0.0 | 1.3 | 1.1 | 0.3 | 0.0 | 33.2 | 0.13 |
| | | | PES | 11.2 c.u. | 7.5 | 0.0 | 2.3 | 1.1 | 0.5 | 0.3 | 33.2 | 0.02 |
| | Sierra White | 1.3 p.u. | Core | 12.8 c.u. | 7.7 | 0.0 | 1.8 | 1.0 | 0.3 | 0.0 | 33.1 | 0.11 |
| | | | PES | 13.9 c.u. | 7.5 | 0.3 | 2.1 | 1.4 | 0.5 | 0.3 | 34.5 | 0.05 |

DETERMINATION OF ELEMENTAL CONCENTRATIONS FROM THE CAPTURE AND INELASTIC ENERGY SPECTRA

FIELD OF THE TECHNOLOGY

The present application relates to techniques for determining the formation composition from nuclear spectroscopy measurements.

BACKGROUND

For many years, nuclear spectroscopy has been utilized as a tool to differentiate between different lithologies, mineralogies, densities, and porosities of subterranean geological formations. In particular, naturally-occurring gamma radiation has been measured within wellbores to derive valuable information regarding the possible location of formations containing desired natural resources (e.g., oil and natural gas, etc.) and induced gamma radiation has been measured within wellbores to derive formation density, fluid-filled porosity, and formation mineralogy. The present application is related to techniques for determining the weight fraction of various compounds in a geological formation directly from elemental count rates that are determined from spectra generated by a pulsed-neutron geochemical logging tool.

SUMMARY

Embodiments described in the disclosure provide methods of determining a composition of formation rock in an earth formation traversed by a borehole. According to some embodiments, the method comprises providing an inelastic spectrum and a capture spectrum each determined using a pulsed-neutron geochemical logging tool conveyed in the borehole, wherein: the inelastic spectrum reflects gamma photons emitted by inelastic interactions of neutrons with elements present in the borehole, formation rock, and formation pores, and wherein the capture spectrum reflects gamma photons emitted by capture interactions of neutrons with elements present in the borehole, formation rock, and formation pores; deconvolving and normalizing the inelastic spectrum and the capture spectrum to determine a normalized set of inelastic yields and a normalized set of capture yields, wherein: the normalized set of inelastic yields reflects elemental yields of inelastic elements present in the borehole, formation rock, and formation pores, and the normalized set of capture yields reflects elemental yields of capture elements present in the borehole, formation rock, and formation pores; transforming the normalized set of inelastic yields and the normalized set of capture yields to determine a transformed set of inelastic yields and a transformed set of capture yields, wherein: the transformed set of inelastic yields reflects only elemental yields of the inelastic elements present in the formation rock, and the transformed set of capture yields reflects only elemental yields of the capture elements present in the formation rock; and using the elemental yields of the inelastic elements present in the formation rock and at least one inelastic calibration function, determining an elemental concentration of at least one of the inelastic elements present in the formation rock.

According to some embodiments, the method further comprises using an oxide closure model to determine an elemental concentration of at least one of the capture elements present in the formation rock, wherein the oxide closure model comprises: the determined elemental concentrations of the at least one of the inelastic elements present in the formation rock, and the elemental yields of the capture elements present in the formation rock determined from the transformed set of capture yields. According to some embodiments, transforming the set of normalized inelastic yields comprises discarding from the set of normalized inelastic yields yields of inelastic elements present in the borehole and in the pores of the formation and then renormalizing the yields of the inelastic elements present in the formation rock. According to some embodiments, the inelastic elements present in the borehole and in the pores of the formation comprise one or more of carbon and oxygen. According to some embodiments, the inelastic elements present in the borehole and in the pores comprise organic carbon. According to some embodiments, the method further comprises providing a measurement of total organic carbon and wherein transforming the set of normalized inelastic yields comprises discarding from the set of normalized inelastic yields an inelastic yield for carbon reflecting the total organic carbon. According to some embodiments, the at least one inelastic calibration function is determined by using the geochemical logging tool to measure a plurality of sample formations comprising known amounts of the at least one inelastic elements. According to some embodiments, the at least one of the inelastic elements comprises aluminum and wherein the plurality of sample formations comprises one or more formations selected from the group consisting of carbonate formations, sandstone formations, and granite formations. According to some embodiments, the at least one of the inelastic elements comprises magnesium and wherein the plurality of sample formations comprises one or more formations selected from the group consisting of sandstone formations and dolomite formations. According to some embodiments, the at least one of the inelastic elements comprises carbon and wherein the plurality of sample formations comprises one or more formations selected from the group consisting of calcite, dolomite, and siderite. The disclosure also provides non-transitory computer readable medium comprising instructions for executing the above-described methods, as well as tools and devices for practicing the methods.

BRIEF DESCRIPTION OF THE DRAWINGS

FIG. 9 shows Table 2 listing known formations used to develop inelastic calibration functions.

DESCRIPTION

Geochemical logging tools use the physical principles of nuclear spectroscopy to ascertain the chemical content of subsurface formations. The formation chemistry, in turn, can be utilized to determine matrix mineralogy, as well as total organic carbon. Petrophysicists are extremely interested in obtaining such data to aid in their understanding of the formation for subsequent hydrocarbon production. Understanding the elemental concentrations and mineralogy of the formation can also provide improved quantitative knowledge of properties such as porosity, grain density, and even permeability.

The tools and methods described herein provide improved geochemical logging data to petrophysicists for interpreting the subsurface properties of a formation. A pulsed neutron generator (PNG) has been incorporated into the design of the tool for recording an inelastic as well as a capture spectrum. The inelastic spectrum adds beneficial measurements of carbon, aluminum, magnesium, silicon, and oxygen. Although the silicon measurement in the capture spectrum is generally very sound, there are cases where it is extremely useful to have the inelastic measurement as well, especially in cases where the salinity in the borehole is very high. Whereas the measurement of aluminum and magnesium in the inelastic spectrum is extremely valuable, perhaps one of the most important elements that can be measured in the inelastic spectrum is carbon, which can be identified as hydrocarbon in conventional formations and as kerogen in unconventional formations. Whereas classical resistivity measurements provide only indirect evidence of carbon, the only direct measurement of carbon is with a geochemical logging tool.

Once the elemental concentrations in the formations have been determined, the next step is to compute the dominant lithology and detailed mineralogy. The lithology classification depends upon the primary, or dominant, elemental composition of the formation, and may have the following classifications: sandstone, shale, carbonate, halite, evaporite, or coal. The mineralogy is based upon a model which is specifically designed for the formation being logged with the tool string and makes use of elemental relationships, cross plots, ternary diagrams, and core data.

Figure 1:
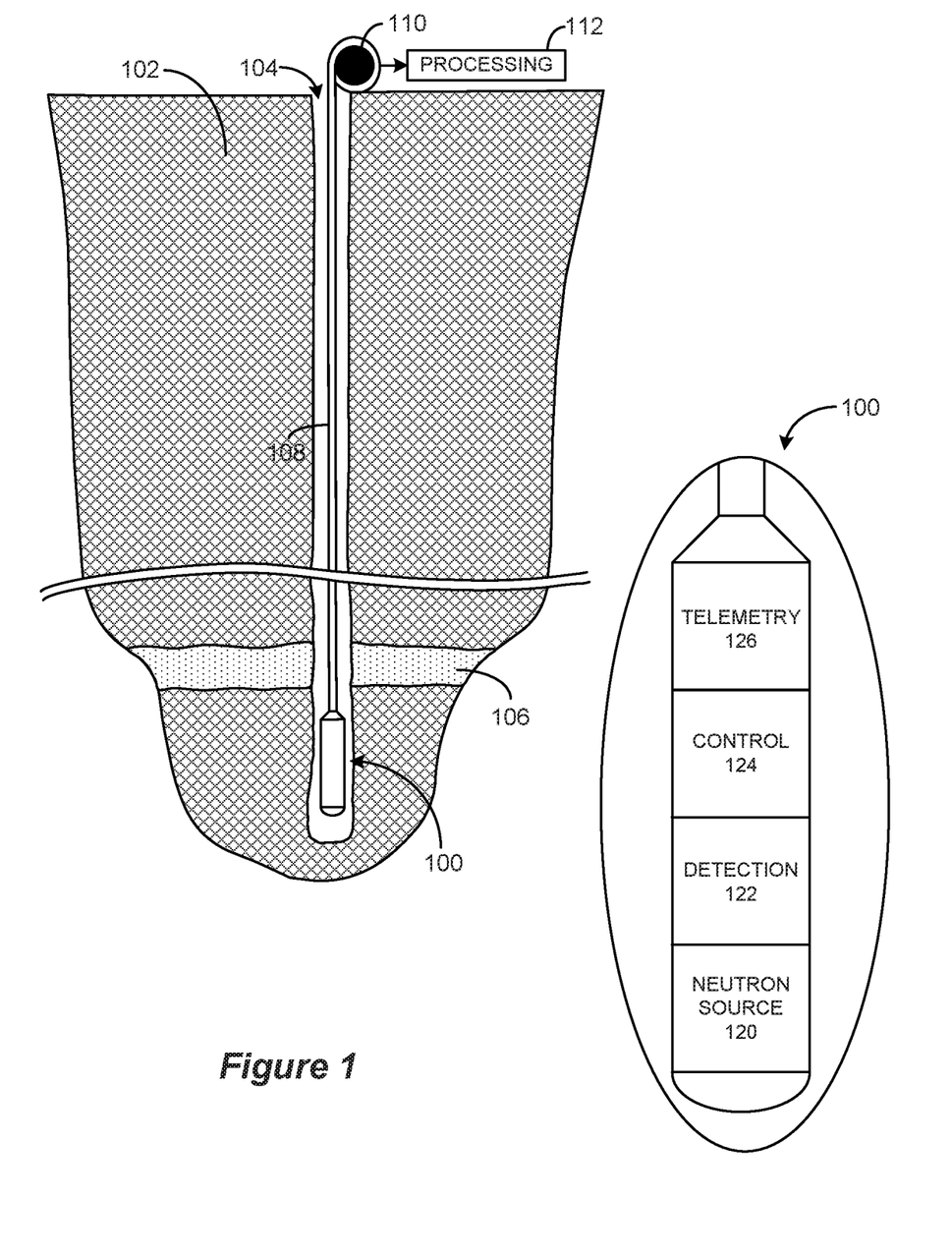
FIG. 1 shows an overview of the various components associated with the deployment of a pulsed-neutron geochemical logging tool in a wellbore in accordance with an embodiment of the disclosure.

FIG. 1 illustrates a pulsed-neutron geochemical logging tool 100 used for obtaining induced gamma radiation measurements relating to the geological formation 102 adjacent to a wellbore 104. Such measurements provide valuable information regarding natural resources that may be located at various depths along the wellbore 104. For example, measurements that are recorded when the tool 100 is adjacent to the region 106 may indicate that it is likely to contain desirable natural resources. In the illustrated embodiment, the tool 100 is conveyed within the wellbore 104 by a wireline logging cable 108 that is connected to draw works 110 and a processing system 112 at the surface. The wireline logging cable 108 supports the weight of the tool 100 and acts as a data conduit between the processing system 112 and the tool 100. While the tool 100 is illustrated as being conveyed via wireline 108, it will be understood that the tool 100 could also be conveyed into the wellbore 104 in other ways such as via coiled tubing, drill string (e.g., during a logging while drilling operation), etc. According to some embodiments, the pulsed-neutron geochemical logging tool 100 may be run as part of a logging string that includes the spectral gamma ray, density, and neutron porosity tools.

The tool 100 includes a neutron source section 120, a detection section 122, a control section 124, and a telemetry section 126. The neutron source section 120 includes a neutron source 130 (FIG. 2) that bombards the formation adjacent the tool 100 with high energy neutrons (e.g., 14 MeV). The neutron source 130 is preferably a pulsed neutron generator, which enables the precisely timed emission of neutrons. The detection section 122 includes one or more detectors that detect gamma radiation that is emitted because of interactions between emitted neutrons and the nuclei of formation elements. According to some embodiments, the detector(s) may be lanthanum bromide ($LaBr_3$) gamma ray detectors (i.e., one or more photomultiplier tubes (PMTS) equipped with $LaBr_3$ scintillation materials). $LaBr_3$(Ce) can provide excellent performance for a nuclear spectroscopy system due to its outstanding properties, which include its elevated density (5.08 g/cm3 density), high resolution, and its ultra-fast decay time (16 nanoseconds). It also provides over 90% of its normal light yield at temperatures up to 350° F. (177° C.). According to some embodiments, the length of the tool can be 11.5 feet, for example, and its diameter can be 3.25 inches. According to some embodiments, the distance between the neutron source 120 and the detection section 122, as well as a significant amount of internal shielding, may be optimized based upon modeling, such as Monte Carlo modeling. According to some embodiments, a boron coating may be applied to the housing near the generator-detector system. Consequently, gamma rays from the housing material from slow, or thermal, neutrons can be eliminated, resulting in a significantly improved capture energy spectrum.

Control section 124 includes control circuitry that controls the operation of the neutron source section 120, detection section 122, and telemetry section 126. The telemetry section 126 includes modulation and demodulation circuitry for sending and receiving electrical signals to and from a remote device such as the processing system 112 (e.g., via wireline 108).

It should be noted that embodiments of the disclosed methods are implemented using one or more information processors, which may be any information processor known in the art, such as one or more microprocessors. Examples of microprocessors include dual-core and quad-core processors and the like. Certain embodiments of the present disclosure may be implemented with a hardware environment that includes an information processor, an information storage medium, an input device, processor memory, and may include peripheral information storage medium. The hardware environment may be downhole, at the surface, and/or at a remote location. Moreover, the several components of the hardware environment may be distributed among those locations. The input device may be any information reader or user input device, such as data card reader, keyboard, USB port, etc. The information storage medium stores information provided by the detectors. The information storage medium may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet-based storage. Embodiments of the information storage medium, referred to herein as a non-transitory computer readable medium, may store a computer program comprising instructions that when executed causes the information processor to execute the disclosed methods. Examples of non-transitory computer readable mediums be any standard computer information storage device, such as a USB drive, memory stick, hard disk, removable RAM, or other commonly used memory storage system known to one of ordinary skill in the art including Internet-based storage. Information processor may be any form of computer or mathematical processing hardware, including Internet-based hardware. When the program is loaded from information storage medium into processor memory (e.g. computer RAM), the program, when executed, causes information processor to retrieve detector information from either information storage medium or peripheral information storage medium and execute the disclosed methods. Information processor may be located on the surface, downhole, and/or at a remote location.

Figure 2:
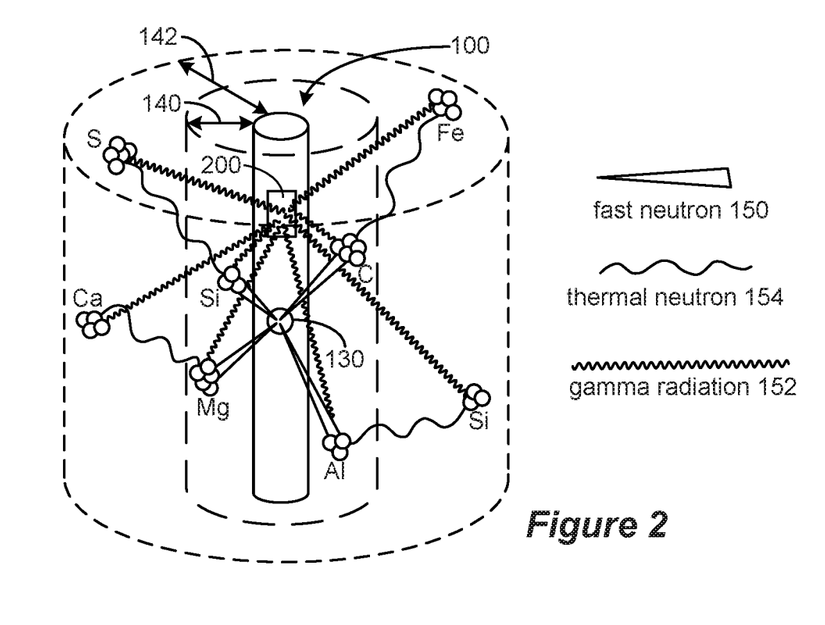
FIG. 2 shows different types of interactions between neutrons emitted by the pulsed-neutron geochemical logging tool and the nuclei of neighboring elements that are detectable by the tool in accordance with an embodiment of the disclosure.

FIG. 2 provides a simplified view of the interactions between neutrons emitted by the tool 100 and the nuclei of neighboring atoms in the formation. Nearer to the neutron source 130 (e.g., within the radius 140), fast-moving neutrons 150 are scattered through inelastic and elastic collisions with the nuclei of atoms in the borehole and in the formation. When inelastic scattering occurs, a portion of the neutron's kinetic energy is transferred to the nucleus of the atom with which it collides, decreasing the energy of the neutron. Often, at least a portion of the energy transferred from the incident neutron to the atom's nucleus briefly activates the nucleus to an unstable, excited state. When the nucleus transitions back to a stable, ground state, it may emit gamma radiation 152 with energy that is characteristic of the atom. As the neutrons move away from the neutron source 130 and continue to lose energy, they reach thermal equilibrium with the surrounding medium. These "thermal neutrons" 154 will eventually be absorbed, i.e., "captured" by the nuclei of neighboring atoms, resulting in new isotopes of the atoms. The capture of a thermal neutron often results in the emission of gamma radiation 152 with energy that is again characteristic of the atom that captured the neutron. The different elements that interact with neutrons in the ways shown in FIG. 2 are described as "detection elements" because the gamma radiation that they produce is detectable and can be attributed to the type of element that resulted in the gamma radiation as described below.

Gamma radiation refers generally to high-energy electromagnetic radiation having an energy level that exceeds 100,000 electron Volts (100 keV). Gamma radiation 152 that is emitted because of the above-described neutron interactions (as well as naturally-occurring gamma radiation) generally has an energy between 100 keV and 10 MeV and is detected by one or more gamma radiation detectors in the tool's 100 detection section 122. Each detector may be placed near the periphery of the tool 100 to minimize the distance between the detector and the gamma radiation source, i.e., the formation 102 traversed by the wellbore 104.

Figure 3A:
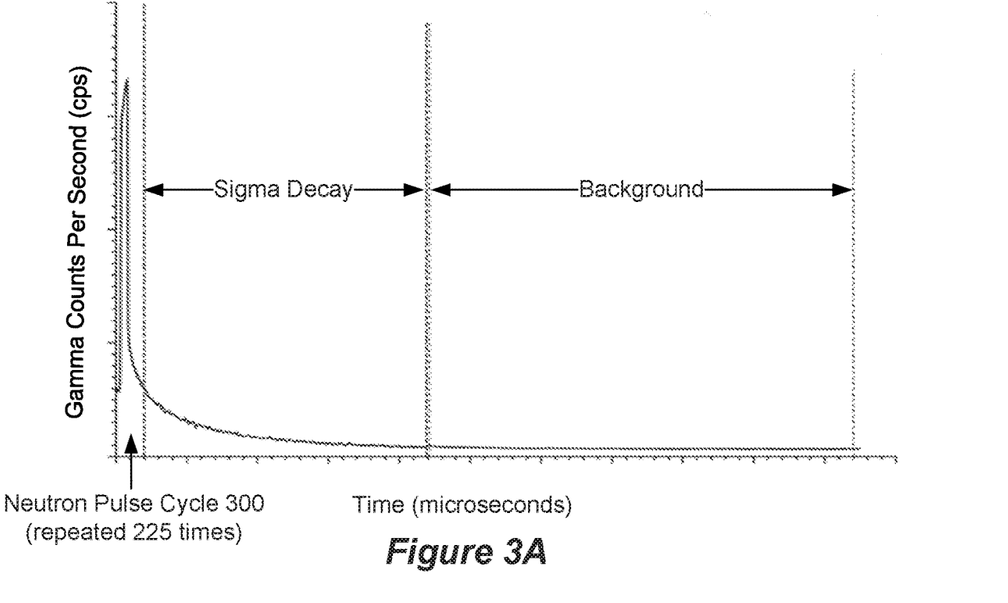
FIGS. 3A and 3B show a sequence of electrical pulses that correspond to the detection of various gamma radiation photons by the gamma radiation detector in accordance with an embodiment of the disclosure and an example of the number of gamma radiation photons that are detected during a neutron pulse cycle in accordance with an embodiment of the disclosure.
Figure 3B:
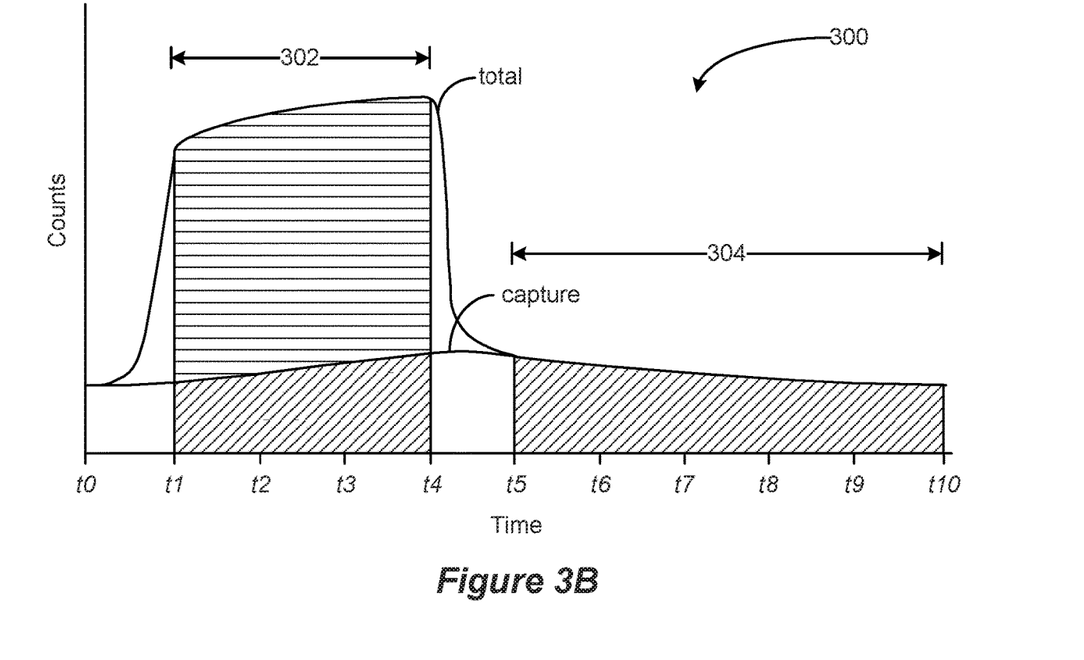

FIG. 3A illustrates the timing of the pulsed neutron tool 100. In the illustrated sequence, a neutron pulse cycle 300 is repeated 225 times. FIG. 3B illustrates a single neutron pulse cycle 302 and shows an example of the total number of detected gamma radiation photons (of various different energy levels) that are observed during the course of a single neutron pulse cycle as well as the number of those total photons that are emitted as a result of a neutron capture interaction. According to some embodiments, the neutron source 130 can be pulsed at 5 kHz, so each detection cycle lasts 200 microseconds. When the neutron source 130 pulse begins at t0, the tool's one or more detectors 200 continue to observe gamma radiation photons that are emitted as a result of neutron capture interactions associated with neutrons that were emitted during the previous neutron pulse(s).

Between t0 and t1, gamma radiation detected by the detectors 200 sharply increases, primarily as a result of inelastic collisions between the emitted neutrons and the nuclei of formation and borehole atoms. The one or more detectors 200 are synchronized with the source 130, and between times t1 and t4 (interval 302), the pulses are digitized by an Analog-to-Digital Converter (ADC) and the digitized pulses, or at least their magnitudes, are stored in a memory. The digitized magnitudes enable each gamma radiation photon observed by the detector to be sorted into a channel based on the photon's energy. According to some embodiments, the full 0-9 MeV detection energy range is divided into 256 channels each having an energy range of approximately 35 keV although other numbers of channels (e.g., 512, 1024, or more) with different energy resolutions may also be used.

Between t4 and t5, gamma radiation sharply declines as inelastic collisions decrease to near zero (i.e., as emitted neutrons lose the energy required for inelastic interactions or move to a distance from the detectors at which such interactions are not easily detectable), and, during this time period, no pulses are stored in the memory. Between t5 and t10 (interval 304), the observed gamma radiation is caused almost exclusively by neutron capture interactions, and the magnitudes of digitized pulses are again stored in the memory. The digitized magnitudes for the pulses detected within the intervals 302 and 304 are provided from memory to a controller (e.g., a microprocessor, a microcontroller, a FPGA, or other logic circuitry). From the data corresponding to the intervals 302 and 304, the controller generates a raw total, or burst, spectrum and a raw capture spectrum, respectively.

Essentially, the raw total spectrum comprises a histogram in which each pulse recorded within the interval 302 increments a count of a particular channel based on its magnitude. Similarly, the raw capture spectrum is essentially a histogram based on the pulses within the interval 304. Each spectrum specifies a quantity of the detected gamma radiation that is within each of a plurality of energy ranges. Although not illustrated, some portion of the gamma radiation detected by the tool 100 may result from background (i.e., naturally-occurring) radiation and/or interactions of emitted neutrons with atoms in a borehole fluid or wellbore conduit (e.g., casing). The raw total and capture and inelastic spectra are processed by the controller 256 to remove these effects, which are recorded during the Background interval, illustrated in FIG. 3A.

Referring again to FIG. 3A, the neutron pulse cycle 300 may be followed by a sigma time decay gate (e.g., 0.002 sec.) and a background gate (e.g., 0.003 sec.). A detailed time spectrum of multiple windows (e.g., 430 windows) can be collected for the burst (e.g., 200 windows), sigma (e.g., 200 windows), and background (e.g., 30 windows) gates. The energy spectrum is also acquired during the burst, capture, and background gates. The energy spectrum from the background gate can be used to correct both the burst and capture energy spectra. To separate inelastic and capture gamma rays during the burst, the capture spectrum is accumulated at each interval during the log and used as an elemental standard. The advantage of this method is that variations in the amount of capture in the burst, due to changes in the borehole and formation, can more accurately be accounted for. Formation sigma can be computed from the gamma ray time-decay spectrum. In addition to being used as an asset to petrophysical interpretation, formation sigma can be used for depth control and for correlation between open and cased-hole logs.

While a chemical neutron source may be used, there are numerous advantages for using a pulsed neutron generator instead of a chemical neutron source. The output flux of neutrons can be controlled electronically, and thus the number of gamma rays emitted by the formation can be paired to the fast electronics of the LaBr3 detector system. Since the outgoing neutrons generally have energies of about 14 MeV, they can generate a complete spectrum of inelastic gamma rays before slowing down to thermal energies, where they are captured. Included among the inelastic gamma rays are carbon, aluminum, magnesium, silicon, and oxygen, all of which may be important for analyzing the properties of the formation. Obtaining a meaningful set of inelastic gamma rays from a chemical neutron source is extremely difficult. Another advantage of the PNG is that the on-off cycle of the generator can be controlled, allowing the creation of a clean capture spectrum. Using a pulsed neutron generator is also much safer, as there is no possibility of losing a chemical source downhole.

Figure 4:
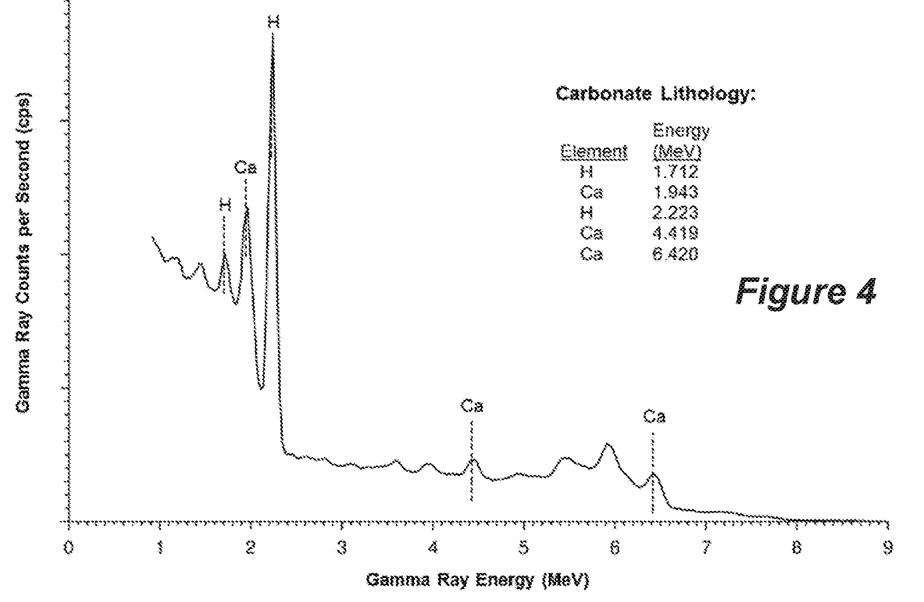
FIG. 4 illustrates an example of the peaks that can be used to align a capture energy spectrum.

During each logging run, the voltage of the PMT can be adjusted in firmware based upon the location of the hydrogen energy peak. The final alignments of the burst, capture, and background spectra, which are required for minimizing the uncertainty in the spectral fit process, are based upon a set of energy peaks that are optimized to the formation being logged. FIG. 4 illustrates an example of the peaks that can be used to align the various energy spectra, which in this case corresponds to that of the capture energy spectrum.

Figure 5:
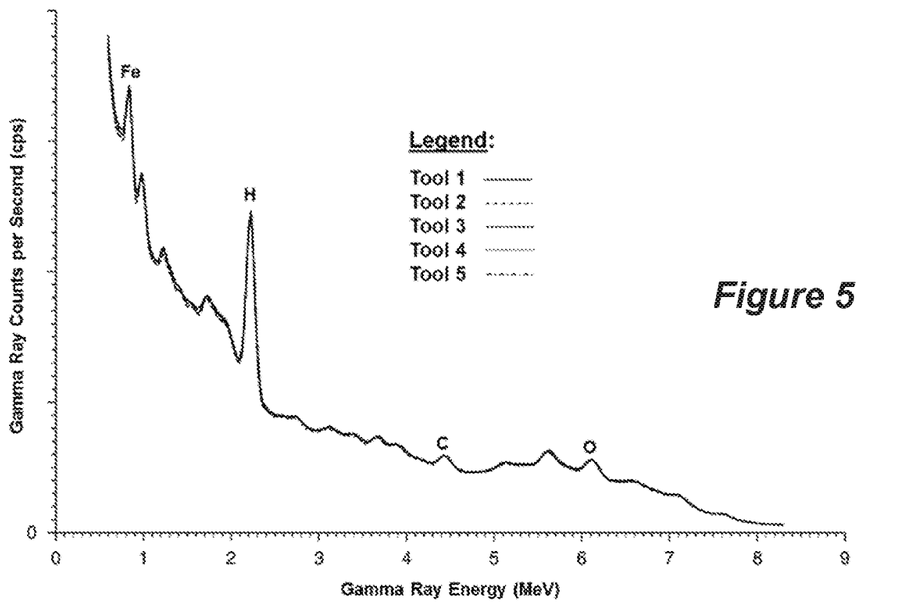
FIG. 5 shows a comparison of 5 tools.

According to some embodiments, the tool 100 can be calibrated using a stainless-steel barrel filled with water that also contains a carbon-based sleeve. The purpose of the calibration procedure is to verify that the tool is working properly, to measure and record both the temperature and voltage of the PMT, and to set the optimal parameters for the pulsed neutron generator. The elemental yields for carbon, iron, oxygen, and hydrogen are measured as part of the verification process. The burst energy spectra from five different tools are compared in FIG. 5. The spectra essentially overlap each other, demonstrating the consistency of the tool-to-tool manufacturing process.

The response of the tool 100 can be characterized based on measurements of formation samples of known composition. To properly analyze the data from both capture and inelastic energy spectra, a complete set of elemental standards, or basis vectors, may be generated. An elemental standard can be defined as the response of the tool for a single element. As a group, they are used to extract and separate the fundamental components of a composite spectrum using a matrix inversion process. Each elemental standard for tool 100 can be derived from empirical data with guidance from modeling, such as Monte Carlo N-Particle (MCNP) modeling and numerous gamma ray energy reference documents, Example techniques are described in the literature. See, for example, Reedy, R. C., and Frankle, S. C.: "Prompt Gamma Rays from Radiative Capture of Thermal Neutrons by Elements from Hydrogen through Zinc," *Atomic Data and Nuclear Data Tables*, Vol. 80, No. 1, pp. 1-34, January, 2002; Choi, H. D., Firestone, R. B., et al.: "Database of Prompt Gamma Rays from Slow Neutron Capture for Elemental Analysis," International Atomic Energy Agency, Vienna, 2007; and Ahmed, M. R., et al. (Part I), and Demidov, A. M, et al. (Part II): "Atlas of Gamma-Ray Spectra from the Inelastic Scattering of Reactor Fast Neutrons," *Atomizdat*, Moscow, 1978. For each such measurement, an attempt can be made to maximize the element for which the standard was being determined. For example, a 1-inch thick iron casing of 99% pure iron can be placed into a water tank to extract the capture and inelastic signals for iron. Some of the primary elemental capture and inelastic spectra are displayed in FIGS. 6A and 6B, respectively. It should be noted that more or fewer elemental standards may be used, as is known in the art.

Some of the elements that are observed to be present in the capture, inelastic, and natural gamma ray energy spectra are listed in Table 1. The term "capture elements" is used herein to refer to elements that are observed in the capture spectrum and the term "inelastic elements" is used herein to refer to elements that are observed in the inelastic spectrum.

TABLE 1

Elements Observed in Capture, Inelastic, and Natural Gamma Ray Energy Spectra.

| Element | Symbol | Capture Spectrum | Inelastic Spectrum | Natural Spectrum |
|---|---|---|---|---|
| Aluminum | Al | x | x | |
| Calcium | Ca | x | x | |
| Carbon | C | | x | |
| Chlorine | Cl | x | | |
| Gadolinium | Gd | x | | |
| Hydrogen | H | x | | |
| Iron | Fe | x | x | |
| Magnesium | Mg | x | x | |
| Oxygen | O | | x | |
| Potassium | K | x | | x |
| Silicon | Si | x | x | |
| Sodium | Na | x | | |
| Sulfur | S | x | x | |
| Thorium | Th | | | x |
| Titanium | Ti | x | x | |
| Uranium | U | | | x |

According to embodiments of the disclosed methods, one goal is to determine the concentrations (i.e., weight fractions) of the various elements present in the formation matrix, i.e., the elements that are present in the rock itself. In other words, we would like to exclude the elements present in the borehole and in the pores of the rock, according to some embodiments.

Figure 6A:
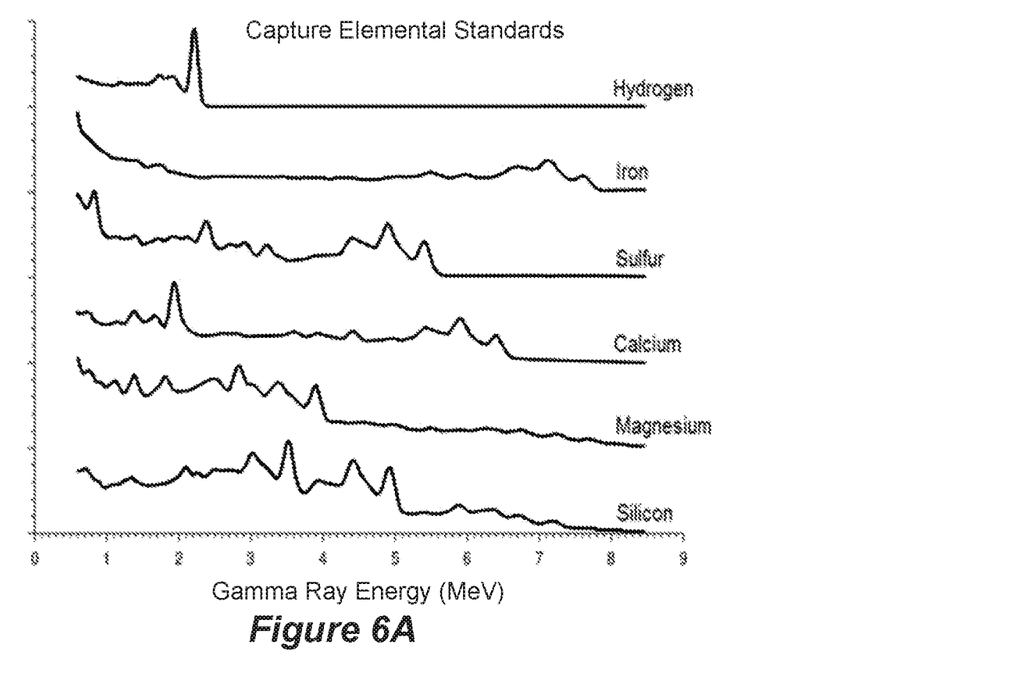
FIGS. 6A and 6B show various characteristic capture and inelastic elemental spectra that contribute to the combined neutron burst spectrum generated by the pulsed-neutron geochemical logging tool in accordance with an embodiment of the disclosure.
Figure 6B:
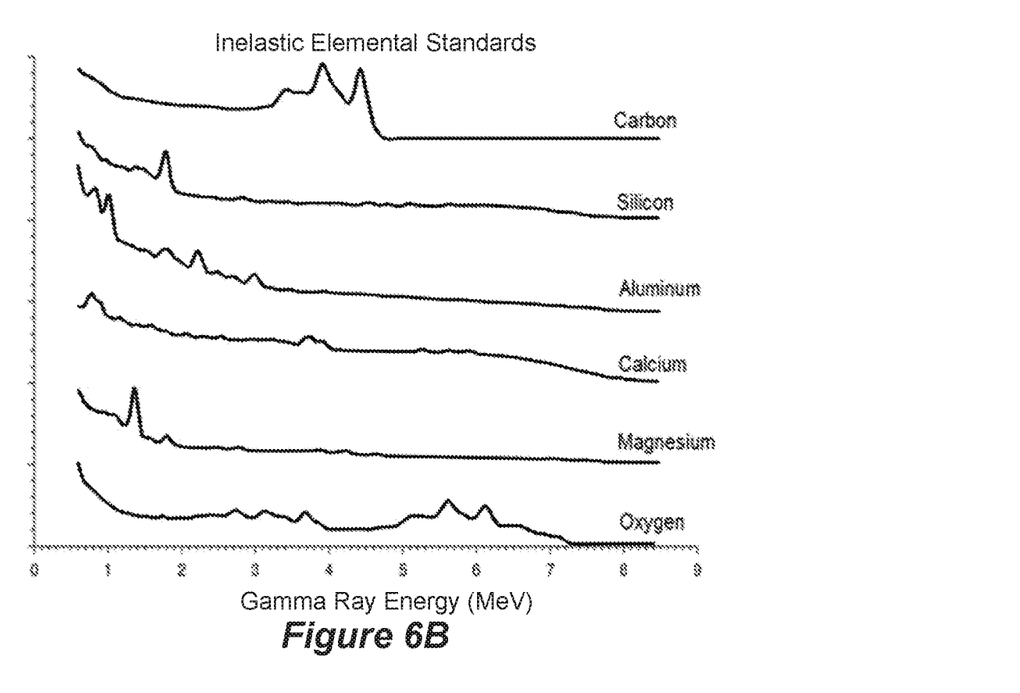
Figure 7:
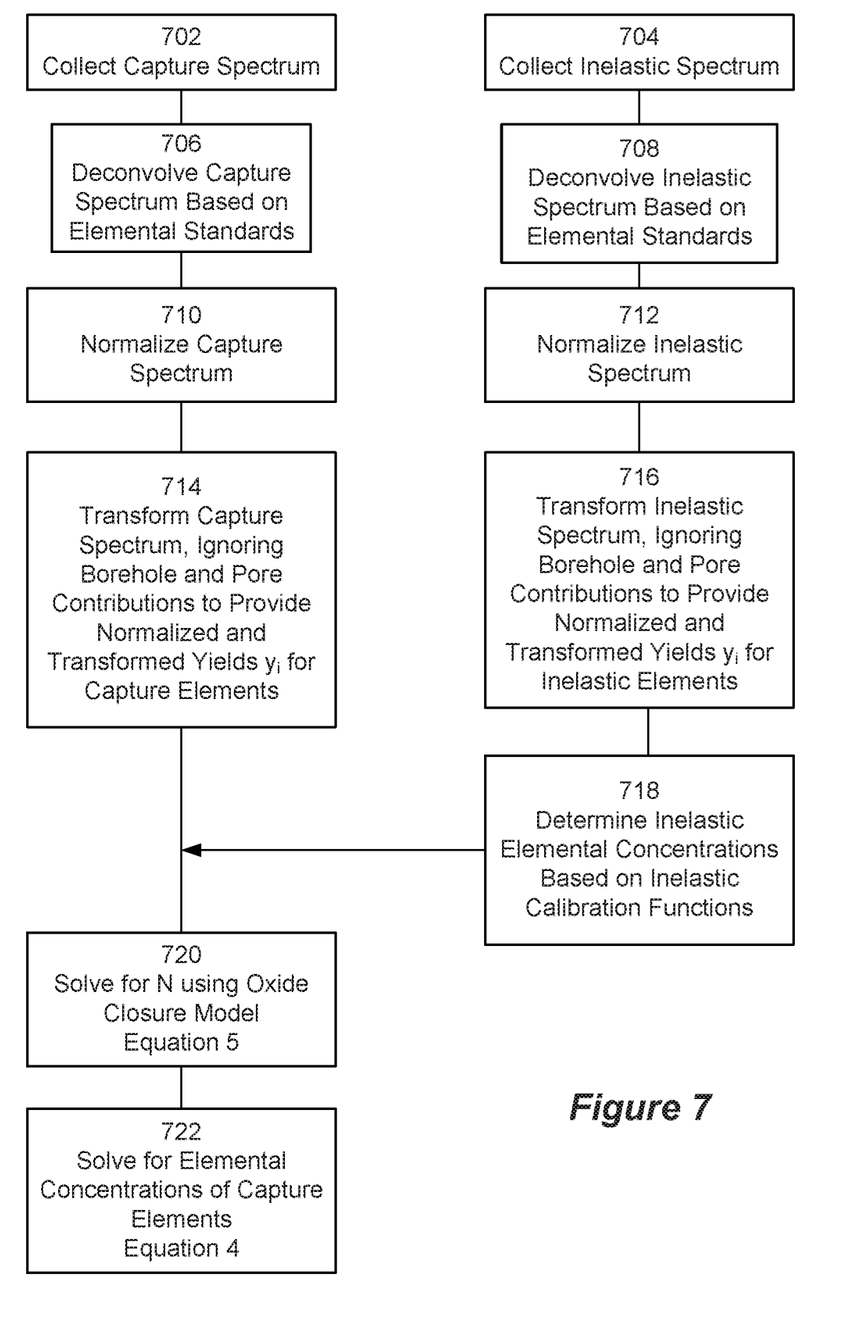
FIG. 7 is a flowchart illustrating a method of determining elemental composition of a formation matrix.

FIG. 7 illustrates an embodiment of the disclosed method for determining the concentrations of the various elements present in the formation matrix. Assume that the total raw capture spectrum and the total raw inelastic spectrum have been collected (702 and 704, respectively). The first step in analyzing capture and inelastic energy spectra is to determine the contribution of the various elements to the capture and inelastic spectra using the mathematics of matrix inversion, referred to herein as deconvolution. Deconvolving the capture spectrum and the inelastic spectrum are denoted in FIG. 7 as 706 and 708, respectively. If we assume that the measured energy spectrum (i.e., the inelastic spectrum and/or the capture spectrum) is a linear combination of the elemental standards, then it follows, mathematically, that:

$$d = y_1 \cdot s_1 + y_2 \cdot s_2 + \ldots + y_n \cdot s_n \quad (1)$$

where d is a column vector of m channels, and where the $y_i$ and $s_i$ values correspond to the elemental yields and standard vectors (corresponding to the elemental standards shown in FIGS. 6A and 6B), respectively, for the n elements. Equation 1 can be written in matrix form as:

$$d = S \cdot y \quad (2)$$

where S is an m×n matrix and y is a column vector of dimension n containing the elemental yields. This system of linear equations can readily be solved using the Weighted Linear Least Squares (WLLS) spectral fit mathematical system, where y can be computed by the equation:

$$y=(S^T W S)^{-1}(S^T W d) \qquad (3)$$

where W is the weighting matrix of dimension an m×m, $w_{ii}=1/\sigma_{d_i}^2$, $\sigma_{d_i}$ is the measurement uncertainty of the $i^{th}$ channel of the measured spectrum. The solution for y ensures a minimized $\chi^2$, which is a common metric for goodness of fit, and is defined as:

$$\chi^2 = \sum_{i=1}^{m} \frac{(c_i - \hat{c}_i)^2}{\sigma_{d_i}^2}$$

where $c_i$ is the $i^{th}$ channel of d, and $\hat{c}_i$ is the ith channel of the fitted spectrum.

In practice, the WLLS method cannot always solve the problem in its simplest form, as two complications must be taken into consideration. First, some of the values of y can numerically become negative when their elemental concentration is small or negligible. This is because the numerical method solely aims to minimize $\chi^2$ with no regard to the physics. To alleviate this problem, the Non-Negative Least Squares (NNLS) method can be employed whereby all elemental yields are constrained to be non-negative. The second difficulty involves the actual fitting of the elemental standards to the spectral data. Whereas the standards are all set to the same energy scale, the measured spectra are subject to shifts resulting from various subsurface conditions such as borehole temperature and changes in PMT voltage. In addition to efforts to stabilize the spectrum through automatic PMT GAIN control, peak detection, and subsequent realignment, the processing algorithm integrates the Levenberg-Marquardt nonlinear fitting method with the NNLS method to improve the accuracy of the final result. More specifically, the iterative Levenberg-Marquardt method deals with shifting the spectra, so that each measured spectrum matches the elemental standards with respect to the gamma ray energy scale. See, e.g., Levenberg, Kenneth: "A Method for the Solution of Certain Non-Linear Problems in Least Squares," *Quarterly of Applied Mathematics*, 2: 164-168, 1944; Marquardt, Donald: "An Algorithm for Least-Squares Estimation of Nonlinear Parameters," *SIAM Journal on Applied Mathematics*, 11 (2): 431-441, 1963; and Bevington, P. R.: *Data Reduction and Error Analysis for the Physical Sciences*, New York: McGraw-Hill, 1992.

The deconvolution of the inelastic and capture spectra determines the contribution (i.e., the number of counts) attributable to each of the detected elements to the total spectrum for each of the inelastic and capture spectra. For example, the deconvolved inelastic spectrum may include contributions from Al, C, Ca, Fe, Mg, O, and Si. The deconvolved capture spectrum may include contributions from Ca, Cl, Fe, Gd, H, K, Mg, S, Si, and Ti. Each of the capture spectrum and the inelastic spectrum are then normalized (710 and 712, respectively). The normalization process involves dividing the counts attributable to each contributing element by the total number of counts in the spectrum to calculate a yield $y_i$ for each element such that the total yield adds up to 1 (i.e., 100%).

The normalized inelastic and capture yields can then be transformed (714 and 716, respectively) to remove contributions to the spectra arising from elements located in the borehole and the pores of the formation. For example, H, O, Cl, and C can be removed from the yields. The transformation process is essentially a re-normalization process wherein contributions from borehole and pore elements are ignored. In this manner the re-normalized elements correspond only to the elements in the formation rock matrix. Thus, the contributions from the borehole and pore space are removed.

Once the elemental yields have been properly re-normalized, the next step is to determine the formation concentrations of the various elements. The concentrations $C_i$ of the elements measured in the capture spectrum can be determined using the formula:

$$C_i = N \cdot (y_i/S_i) \qquad (4)$$

where $y_i$ represents the normalized yield for the $i^{th}$ element after both hydrogen and chlorine have been removed, and where $S_i$ is the sensitivity of the $i^{th}$ element. The sensitivities can be determined for each element based upon a combination of empirical measurements and MCNP modeling, as is known in the art. N in Equation 4 is a normalization factor, which is a complex function of nearly every physical parameter of the borehole/formation environment and which is also dependent on the neutron source strength. It is very difficult to calculate N directly. Thus, according to embodiments of the disclosed methods, N is calculated using the oxide closure model.

The oxide closure model uses the principle that once the chemical compounds in the formation are identified, most of which are oxides, they must physically sum to unity. It is expressed for the model described herein by the equation:

$$N[\Sigma_{i=1}^{n}(y_i/S_i)O_i] + C_K O_K + C_{Mg} O_{Mg} + C_{Al} O_{Al} = 1 \qquad (5)$$

where the $(y_i/S_i)$ values inside the brackets of Equation 5 correspond to the concentrations of the various capture elements, and the $O_i$ values in all cases compensate for the related elements in the chemical compound or oxide that must be accounted for.

Notice that to solve for N using the oxide closure model, we must also know the concentrations of the various non-capture elements and their associated oxides. In Equation 5, the non-capture elements are K, Mg, and Al. However, according to some embodiments the oxides closure model may consider additional non-capture elements. The concentrations of the non-capture elements may be provided in various ways. According to some embodiments, some or all the non-capture elements of Equation 5 are determined based on the inelastic spectrum, as described above. Moreover, the concentrations of some of the non-capture elements may be determined using other logging techniques. For example, potassium can be computed from the natural gamma ray spectroscopy logging tool. Magnesium and aluminum can be computed from the inelastic spectrum.

In the embodiment of the method illustrated in FIG. 7, the concentrations of the non-capture elements are determined based on the inelastic spectrum 718. More specifically, the elemental concentrations of the inelastic elements can be calculated based on the normalized (and transformed) yields determined from the inelastic spectrum (i.e., based on the yields determined from step 716 of FIG. 7). The concentrations are determined based on a calibration function that is derived for each inelastic element based on numerous measurements in formations containing varying amounts of the element. Thus, calibration curves must be provided for each of the inelastic elements by performing measurements on a plurality of different formations having varying concentrations of the inelastic elements.

Figure 8A:
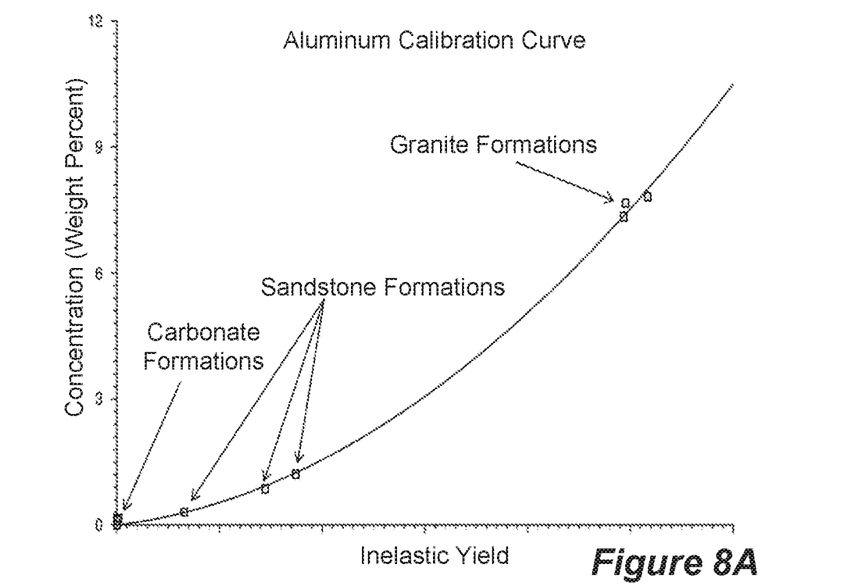
FIGS. 8A and 8B show inelastic calibration functions for aluminum and magnesium, respectively.
Figure 8B:
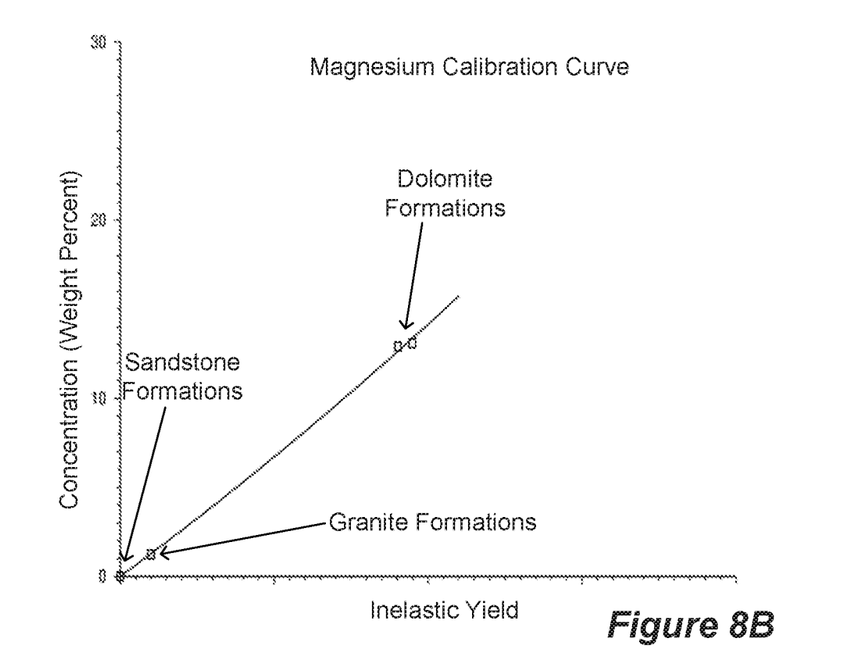

FIG. 8A illustrates a calibration curve generated for aluminum. The aluminum calibration curve shown in FIG. 8A was derived based on numerous measurements in formations containing varying amounts of aluminum. For example, the calibration curve (i.e., calibration function) for aluminum may be determined based on measurements of carbonate, sandstone, and granite formations. The calibration function is generally a polynomial function that relates the concentration of the element to that element's inelastic yield based on polynomial regression curve fitting of data determined using known standards. FIG. 8B illustrates a similar calibration curve for magnesium. The calibration curve (i.e., calibration function) for magnesium may be determined based on measurements of sandstone and dolomite formations and measurements of a magnesium block. The elemental calibration functions described herein were tested on 14 different formations, and the results are listed in Table 2 (shown in FIG. 9). However, the number of tests used to derive the elemental calibration functions may be varied based on availability of standard sample formations and required precision. For each formation listed in Table 2, the computed elemental concentrations are provided along with those determined from core data. Cores were analyzed using a combination of ICP-OES, ICP-MS, ED-XRF, and Activation Analysis. Included in the test were 4 sandstone formations, 4 limestone formations, 3 dolomite formations, and 3 granite formations. Due to their elemental content, granite formations can provide a laboratory substitute for shale. According to some embodiments, the formations may be at least 5 ft. in diameter, and the porosities may range from 0-24 p. u.

Referring again to FIG. 7, once the non-capture elemental concentrations have been determined, those elemental concentration can be fed into the oxide closure model to solve for N using Equation 5 (720). For example, the inelastic element concentrations determined based on the inelastic calibration functions can be fed into the oxide closure model. Likewise, the concentrations of additional non-capture elements determined using other techniques, such as potassium determined based on natural gamma spectrum, can be fed into the oxide closure model. Thus, according to some embodiments, Equation 5 can incorporate measurements from the natural, capture, and inelastic spectra, as well as other logging techniques. According to alternative embodiments, silicon can be determined from the inelastic spectrum and/or magnesium can be determined from the capture spectrum. Once N is determined based on Equation 5, the elemental concentrations of the capture elements can be determined using Equation 4 (722).

One of the advantages of the disclosed methods is that Equations 4 and 5 correspond only to elements in the formation matrix. This is because borehole/pore elements, such as hydrogen and chlorine are removed from the capture spectrum, and oxygen and carbon are removed similarly from the inelastic spectrum. The results correspond directly to the matrix and thus are independent of the properties of the borehole or pores.

According to some embodiments, carbon can be determined from the inelastic spectrum in a manner very similar to that for aluminum and magnesium, the calibration curves for which are shown in FIGS. 8A and 8B. For example, the carbon in limestone and dolomite formations, as listed in Table 2 of FIG. 9, can be used to determine a calibration function for inorganic carbon. The tool can also be placed into an oil tank to obtain a measurement of hydrocarbon based upon the specific API value of the oil present in the oil tank. In all these cases, the amount of carbon is related to the corresponding yield for carbon in the inelastic energy spectrum. Core data from field logs can also be incorporated into the calibration curve(s) for carbon.

Embodiments of the disclosed methods allow carbon that is present in the formation rock to be included in the oxide closure calculation and carbon that is present in the borehole and in formation pores to be excluded from the oxide closure calculation. According to some embodiments, carbon in the boreholes and pores is assumed to be organic carbon and carbon in the formation rock is assumed to be inorganic carbon. The carbon measured in the inelastic spectrum $C_{Measured}$ includes both organic and inorganic carbon:

$$C_{Measured} = C_{inorganic} + C_{Total\ Organic\ Carbon} \quad (6)$$

where $$C_{Inorganic} = C_{Calcite} + C_{Dolomite} + C_{Siderite} \quad (7)$$

Thus, total organic carbon can be measured using an independent method, such as resistivity. An example of a method for measuring total organic carbon is disclosed in co-owned application Ser. No. 15/632,971, filed Jun. 26, 2017, the contents of which are incorporated herein by reference. Once the total organic carbon is determined, the inelastically measured carbon can be adjusted and the yield of the inorganic carbon can be determined.

In addition to determining elemental concentrations, the logging tool 100 can also measure intrinsic sigma, that is, the capture cross section of the formation. A dual exponential fit can be applied to the capture decay curve as illustrated in FIG. 2). The result of the fit can be used to compute an apparent formation sigma, which can then be transformed into an intrinsic sigma using the results of a detailed characterization based on numerous empirical measurements, 13 of which were obtained in the formations listed in Table 2 of FIG. 9. This transform, or diffusion correction, can be achieved with the help of measurements obtained in the same formations as those from a 4-detector cased-hole pulsed-neutron formation evaluation logging tool. By comparing the measurements from the pulsed-neutron geochemical logging tool with those from the 4-detector pulsed-neutron cased-hole tool, a transformation equation can be derived that converts the measured sigma to an intrinsic sigma. This transform is required, since the geochemical logging tool contains only a single detector, whereas the cased-hole tool contains 4 detectors with different spacings, from which a true intrinsic measurement can be obtained. A comparison of an embodiment of the tool's sigma measurements, after the transform has been applied, with those of intrinsic sigma is provided in Table 2, where the average difference is only 0.55 capture units.

Whereas mineralogy provides a detailed look at the specific minerals present in the formation, lithology provides a more generalized, or quick, look at the formation. Embodiments of a logging system using the tool 100 may thus calculate a dominant lithology. Such lithologies may include, for example, sandstone, shale, carbonate, halite, evaporite, and coal. The dominant lithology may be determined based upon the elemental concentrations of the formation matrix based on relative amounts of the rock-forming oxides such as CaO, $SiO_2$, and $Al_2O_3$, which are used to determine carbonates, sandstones, and shales, respectively. Sulfur, in association with CaO and $Fe_2O_3$ measurements, may be used to classify evaporites such as anhydrite. Chlorine may be used to classify halite and carbon is used to classify coal.

While the invention herein disclosed has been described in terms of specific embodiments and applications thereof, numerous modifications and variations could be made thereto by those skilled in the art without departing from the scope of the invention set forth in the claims.

What is claimed is:

1. A method of determining a composition of formation rock in an earth formation traversed by a borehole, the method comprising:
    providing an inelastic spectrum and a capture spectrum each determined using a pulsed-neutron geochemical logging tool conveyed in the borehole, wherein:
        the inelastic spectrum reflects gamma photons emitted by inelastic interactions of neutrons with elements present in the borehole, formation rock, and formation pores, and wherein
        the capture spectrum reflects gamma photons emitted by capture interactions of neutrons with elements present in the borehole, formation rock, and formation pores;
    deconvolving and normalizing the inelastic spectrum and the capture spectrum to determine a normalized set of inelastic yields and a normalized set of capture yields, wherein:
        the normalized set of inelastic yields reflects elemental yields of inelastic elements present in the borehole, formation rock, and formation pores, and
        the normalized set of capture yields reflects elemental yields of capture elements present in the borehole, formation rock, and formation pores;
    transforming the normalized set of inelastic yields and the normalized set of capture yields to determine a transformed set of inelastic yields and a transformed set of capture yields, wherein:
        the transformed set of inelastic yields reflects only elemental yields of the inelastic elements present in the formation rock, and
        the transformed set of capture yields reflects only elemental yields of the capture elements present in the formation rock; and
    using the elemental yields of the inelastic elements present in the formation rock as determined from the transformed set of inelastic yields and at least one inelastic calibration function, determining an elemental concentration of at least one of the inelastic elements present in the formation rock.

2. The method of claim 1, further comprising using an oxide closure model to determine an elemental concentration of at least one of the capture elements present in the formation rock, wherein the oxide closure model comprises:
    the determined elemental concentrations of the at least one of the inelastic elements present in the formation rock, and
    the elemental yields of the capture elements present in the formation rock determined from the transformed set of capture yields.

3. The method of claim 1, wherein transforming the set of normalized inelastic yields comprises discarding from the set of normalized inelastic yields yields of inelastic elements present in the borehole and in the pores of the formation and then renormalizing the yields of the inelastic elements present in the formation rock.

4. The method of claim 3, wherein the inelastic elements present in the borehole and in the pores of the formation comprise one or more of carbon and oxygen.

5. The method of claim 4, wherein the inelastic elements present in the borehole and in the pores comprise organic carbon.

6. The method of claim 3, wherein in the method further comprises providing a measurement of total organic carbon and wherein transforming the set of normalized inelastic yields comprises discarding from the set of normalized inelastic yields an inelastic yield for carbon reflecting the total organic carbon.

7. The method of claim 1, wherein the at least one inelastic calibration function is determined by using the geochemical logging tool to measure a plurality of sample formations comprising known amounts of the at least one inelastic elements.

8. The method of claim 7, wherein the at least one of the inelastic elements comprises aluminum and wherein the plurality of sample formations comprises one or more formations selected from the group consisting of carbonate formations, sandstone formations, and granite formations.

9. The method of claim 7, wherein the at least one of the inelastic elements comprises magnesium and wherein the plurality of sample formations comprises one or more formations selected from the group consisting of sandstone formations and dolomite formations.

10. The method of claim 7, wherein the at least one of the inelastic elements comprises carbon and wherein the plurality of sample formations comprises one or more formations selected from the group consisting of calcite, dolomite, and siderite.

11. A non-transitory computer readable medium comprising instructions, which when executed on a processor configure the processor to perform a method comprising:
    obtaining an inelastic spectrum and a capture spectrum each determined using a pulsed-neutron geochemical logging tool conveyed in the borehole, wherein:
        the inelastic spectrum reflects gamma photons emitted by inelastic interactions of neutrons with elements present in the borehole, formation rock, and formation pores, and wherein
        the capture spectrum reflects gamma photons emitted by capture interactions of neutrons with elements present in the borehole, formation rock, and formation pores;
    deconvolving and normalize the inelastic spectrum and the capture spectrum to determine a set of normalized inelastic yields and a set of normalized capture yields, wherein:
        the set of normalized inelastic yields reflects elemental yields of inelastic elements present in the borehole, formation rock, and formation pores, and
        the set of normalized capture yields reflects elemental yields of capture elements present in the borehole, formation rock, and formation pores;
    transforming the set of normalized inelastic yields and the set of normalized capture yields to determine a transformed inelastic yield and a transformed capture yield, wherein:
        the transformed set of inelastic yields reflects only elemental yields of the inelastic elements present in the formation rock, and
        the transformed set of capture yields reflects only elemental yields of the capture elements present in the formation rock; and
    using the elemental yields of the inelastic elements present in the formation rock determined from the transformed set of inelastic yields and at least one inelastic calibration function to determine an elemental concentration of at least one of the inelastic elements present in the formation rock.

12. The non-transitory computer readable medium of claim 11, further comprising using an oxide closure model to determine an elemental concentration of at least one of the capture elements present in the formation rock, wherein the oxide closure model comprises:
the determined elemental concentrations of the at least one of the inelastic elements present in the formation rock, and
the elemental yields of the capture elements present in the formation rock determined from the set of transformed capture yields.

13. The non-transitory computer readable medium of claim 11, wherein transforming the set of normalized inelastic yields comprises discarding from the set of normalized inelastic yields those yields of inelastic elements present in the borehole and in the pores of the formation and renormalizing the yields of the inelastic elements present in the formation rock.

14. The non-transitory computer readable medium of claim 13, wherein the inelastic elements present in the borehole and in the pores of the formation comprise one or more of carbon and oxygen.

15. The non-transitory computer readable medium of claim 14, wherein the inelastic elements present in the borehole and in the pores comprise organic carbon.

16. The non-transitory computer readable medium of claim 13, wherein in the method further comprises providing a measurement of total organic carbon and wherein transforming the set of normalized inelastic yields comprises discarding from the set of normalized inelastic yields a yield for carbon reflecting the total organic carbon.

17. The non-transitory computer readable medium of claim 11, wherein the at least one inelastic calibration function is determined by using the geochemical logging tool to measure a plurality of sample formations comprising known amounts of the at least one inelastic elements.

18. The non-transitory computer readable medium of claim 17, wherein the at least one of the inelastic elements comprises aluminum and wherein the plurality of sample formations comprises one or more formations selected from the group consisting of carbonate formations, sandstone formations, and granite formations.

19. The non-transitory computer readable medium of claim 17, wherein the at least one of the inelastic elements comprises magnesium and wherein the plurality of sample formations comprises one or more formations selected from the group consisting of sandstone formations and dolomite formations.

20. The non-transitory computer readable medium of claim 17, wherein the at least one of the inelastic elements comprises carbon and wherein the plurality of sample formations comprises one or more formations selected from the group consisting of calcite, dolomite, and siderite.

* * * * *